United States Patent
Iyatani

(10) Patent No.: US 8,807,015 B2
(45) Date of Patent: Aug. 19, 2014

(54) PISTON PUMP

(75) Inventor: Masatoshi Iyatani, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 729 days.

(21) Appl. No.: 13/073,382

(22) Filed: Mar. 28, 2011

(65) Prior Publication Data

US 2011/0239857 A1  Oct. 6, 2011

(30) Foreign Application Priority Data

Mar. 31, 2010 (JP) ................. 2010-083804
Mar. 31, 2010 (JP) ................. 2010-083805

(51) Int. Cl.
| | | |
|---|---|---|
| *F16J 1/10* | (2006.01) | |
| *F01B 31/00* | (2006.01) | |
| *F16J 10/04* | (2006.01) | |
| *F04B 39/10* | (2006.01) | |
| *F04B 1/04* | (2006.01) | |
| *F04B 53/12* | (2006.01) | |
| *B60T 8/40* | (2006.01) | |

(52) U.S. Cl.
CPC ............. *F04B 1/0421* (2013.01); *F04B 1/0408* (2013.01); *F04B 53/125* (2013.01); *B60T 8/4031* (2013.01); *F05C 2253/20* (2013.01)
USPC ............. 92/129; 92/169.1; 92/181 P; 92/255; 417/549

(58) Field of Classification Search
USPC ......... 92/129, 163, 169.1, 181 R, 181 P, 255; 417/549, 554
See application file for complete search history.

(56) References Cited

U.S. PATENT DOCUMENTS

| | | | | |
|---|---|---|---|---|
| 4,856,416 A | * | 8/1989 | Nix et al. ................. | 92/169.1 |
| 6,283,724 B1 | * | 9/2001 | Alaze et al. ............... | 417/470 |
| 7,806,671 B2 | * | 10/2010 | Maeda ...................... | 417/471 |
| 7,938,057 B2 | * | 5/2011 | Zimmermann ............. | 92/129 |
| 8,272,858 B2 | * | 9/2012 | Bollwerk et al. .......... | 417/549 |
| 2008/0226479 A1 | * | 9/2008 | Schuller et al. ........... | 417/545 |

FOREIGN PATENT DOCUMENTS

| | | |
|---|---|---|
| JP | 11257245 | 9/1999 |
| JP | 2005090402 | 4/2005 |
| JP | 2006504029 | 2/2006 |
| JP | 2008111355 | 5/2008 |

* cited by examiner

*Primary Examiner* — Michael Leslie
(74) *Attorney, Agent, or Firm* — Andrew M. Calderon; Roberts Mlotkowski Safran & Cole, P.C.

(57) ABSTRACT

According to one embodiment, there is provide a piston pump, including: a cylinder having a bottomed cylindrical shape; a piston slidable within the cylinder, the cylinder and the piston defining a pressure chamber therebetween; a suction valve unit disposed in a suction passage of the pressure chamber; and a discharge valve unit disposed in a discharge passage of the pressure chamber, wherein the piston includes a cylindrical piston portion and a large diameter piston portion provided to cover one end of the cylindrical piston portion, and wherein the large diameter piston portion includes a working fluid guide groove extending thereinside along the axial direction of the piston.

20 Claims, 5 Drawing Sheets

PISTON PUMP

CROSS-REFERENCE TO RELATED APPLICATION(S)

This application claims priorities from Japanese Patent Application No. 2010-083804 filed on Mar. 31, 2010, and from Japanese Patent Application No. 2010-083805 filed on Mar. 31, 2010, the entire contents of which are incorporated herein by reference.

FIELD

An embodiment described herein relate to a piston pump.

BACKGROUND

Generally, a piston pump is used in a brake fluid pressure control apparatus for a vehicle. For example, JP-2006-504029-A discloses a piston pump in which a piston is formed of a needle (a first piston portion) and a resin portion (a second piston portion), and a passage for sucking a working fluid therethrough is formed in the contact surface between the first and second piston portions. The working fluid passage extends in the radial direction of the piston.

Also, JP-2005-090402-A discloses a piston pump which is composed of a metal-made piston and a resin-made sheet member and includes multiple communication grooves respectively formed in the outer periphery of the piston to extend in the axial direction. A working fluid is allowed to flow from a suction passage through the communication grooves into a pump chamber.

According to the piston pump of JP-2006-504029-A, since the working fluid passage extends perpendicularly to the piston moving direction, the reciprocating operation of the piston does not contribute to the suction of the working fluid. Therefore, the suction of the working fluid merely rely on the negative pressure of a working chamber, resulting in the poor suction efficiency.

Also, according to the piston pump of JP-2005-090402-A, since the metal-made piston has a complicated structure (multiple communication grooves), the piston needs a complicated working operation, resulting in the increased costs of the composing parts of the piston pump.

On the other hand, JP-2008-111355-A discloses a piston pump in which a cylinder is formed by cutting a metal-made member to thereby enhance the durability. Also, JP-H11-257245-A discloses a piston pump in which a cylinder is formed of a resin molding to thereby enhance the workability.

In the piston pump of JP-2008-111355-A, since the cylinder is formed by cutting the metal-made member, production of such cylinder requires much time and labor as well as the cost thereof. In view of this, the material that can be cut efficiently may be selected as the material for forming the cylinder. However, when such easily-cuttable material is used, a heat treatment will be required to enhance the durability of the cylinder after the cutting working, and the further cutting working may be required to remove the distortion caused by the heat treatment. Since such working operation is necessitated, the cost can not be reduced.

In the piston pump of JP-H11-257245-A, since the cylinder is formed of a resin molding, a cutting working is not necessary. However, in this case, the cylinder does not have durability that can withstand the repeated sliding movements of the piston. When specific material such as carbon fiber is used to enhance the durability of the cylinder, the cost of the cylinder and thus the cost of the piston pump will be increased.

SUMMARY

One object of the invention is to provide a piston pump which, while preventing the costs of the composing parts thereof from increasing, can enhance the efficiency of suction of the working fluid.

According to an aspect of the present invention, there is provided a piston pump, including: a cylinder having a bottomed cylindrical shape; a piston slidable within the cylinder, the cylinder and the piston defining a pressure chamber therebetween; a suction valve unit disposed in a suction passage of the pressure chamber; and a discharge valve unit disposed in a discharge passage of the pressure chamber, wherein the piston includes a cylindrical piston portion and a large diameter piston portion provided to cover one end of the cylindrical piston portion, and wherein the large diameter piston portion includes a working fluid guide groove extending thereinside along the axial direction of the piston.

According to the above structure, since the working fluid guide groove is formed along the moving direction of the piston, the suction resistance can be reduced, which can facilitate the suction of the working fluid into the guide groove in the return step of the piston (that is, when the pressure chamber is spread). This can enhance the suction efficiency of the working fluid. Also, since the cylindrical piston portion has a simple cylindrical shape, the costs of the composing parts of the piston pump can be prevented from being increased.

There may be provided the piston pump, wherein the working fluid guide groove includes multiple lines of working fluid guide grooves, and wherein, on an inner peripheral surface of the large diameter piston portion, multiple fit portions are formed between the multiple working fluid guide grooves so as to be fitted with the one end of the cylindrical piston portion.

According to the above structure, the formation of the multiple lines of working fluid guide grooves can facilitate the suction of a lot of working fluids, thereby enhancing the suction efficiency of the working fluids further. Also, since the multiple fit portions are formed, the cylindrical piston portion can be easily positioned in the radial direction thereof, the cylindrical piston portion can be easily fixed to the large diameter piston portion, and in the sliding operation of the piston, the cylindrical piston portion can be prevented from shifting from the large diameter piston portion.

There may be provided the piston pump, wherein the large diameter piston portion includes an axial direction position restricting portion to be contacted with the cylindrical piston portion in the piston axial direction.

According to the above structure, when the cylindrical piston portion is fitted with the large diameter piston portion, the fitting position can be restricted by the contact of the cylindrical piston portion with the large diameter piston portion, which can facilitate the positioning of the cylindrical piston portion in the axial direction thereof.

There may be provided the piston pump, wherein the large diameter piston portion includes a valve seat portion formed thereinside to receive a suction valve body of the suction valve unit, the large diameter piston portion being formed continuously with the working fluid guide grooves.

According to the above structure, when the working fluids pass through the guide grooves, they are sucked into the pressure chamber. This can enhance further the suction efficiency of the working fluids.

There may be provided the piston pump, wherein the large diameter piston portion is formed by resin molding.

According to the above structure, since the large diameter piston portion having a relatively complicated shape can be easily formed without carrying out a cutting working operation or the like, the large diameter piston portion can be manufactured at a low cost.

There may be provided the piston pump, wherein the cylindrical piston portion is formed of a metal-made core-shaped roller member.

According to the above structure, the cylindrical piston portion can be formed of a general-purpose member and there can be eliminated the need to work it. Therefore, the cylindrical piston portion can be obtained at a low cost.

There may be provided the piston pump, wherein the cylinder includes a metal-made pipe cylinder portion as a sliding portion with respect to the piston and a bottomed-cylindrical resin cylinder portion provided to cover an outer periphery of the pipe cylinder portion, and wherein the pipe cylinder portion is formed integrally with the resin cylinder portion by insert molding.

According to the above structure, since neither the resin cylinder portion nor pipe cylinder portion needs any cutting working operation, the cylinder can be manufactured at a low cost. Also, since the surface of the cylinder on which the piston slides is formed of the metal-made pipe cylinder portion, the durability of the cylinder can be secured. Further, since the pipe cylinder portion and resin cylinder portion are formed as an integral body by insert molding, the number of parts in assembling them does not increase. This can prevent the assembling time and labor from increasing.

According to the piston pump of the invention, while preventing the increased costs of the composing parts thereof, the suction efficiency of the working fluid can be enhanced.

Another object of the invention is to provide a piston pump which, while preventing the increased cost of the composing parts thereof, can enhance the durability thereof.

According to another aspect of the present invention, there is provided a piston pump, including: a cylinder having a bottomed cylindrical shape; a piston slidable within the cylinder, the cylinder and the piston defining a pressure chamber therebetween; a suction valve unit disposed in a suction passage of the pressure chamber; and a discharge valve unit disposed in a discharge passage of the pressure chamber, wherein the cylinder includes a metal-made pipe cylinder portion as a sliding portion with respect to the piston and a bottomed-cylindrical resin cylinder portion provided to cover an outer periphery of the pipe cylinder portion.

According to the above structure, neither the resin cylinder portion nor pipe cylinder portion need not any cutting working, thereby manufacturing the piston pump at a low cost. Also, since the surface on which the piston slides is formed of the metal-made pipe cylinder portion, the durability of the piston pump can be secured.

There may be provided the piston pump, wherein the pipe cylinder portion is formed integrally with the resin cylinder portion by insert molding.

According to above structure, since the number of composing parts in the piston pump assembling operation does not increase, an increase in time and labor necessary for the assembling operation can be prevented.

There may be provided the piston pump, wherein the pipe cylinder portion includes an outwardly-spreading flange portion in an opening end thereof, and wherein the flange portion is embedded in the resin cylinder portion.

According to the above structure, a flange portion, which is usually produced when a pipe cylinder portion is formed by press working, can be used effectively without removing it. Also, the precision of engagement between the pipe cylinder portion and resin cylinder portion can be enhanced.

There may be provided the piston pump, wherein the resin cylinder portion includes a valve seat portion formed to receive a discharge valve body of the discharge valve unit.

According to the above structure, it is not necessary to provide the separate valve seat portion, thereby reducing time and labor necessary to manufacture the resin cylinder portion as well as the cost therefor. Also, since the valve seat portion is formed of resin, as compared with a case where the valve seat portion is formed of metal, the valve seat portion and the discharge valve body are more closely contacted.

There may be provided the piston pump, wherein a working fluid discharge guide groove is formed on a portion of an outside surface of a bottom portion of the resin cylinder portion which faces a cap covering a pump hole, and wherein the working fluid discharge guide groove guides the working fluid from the discharge passage to a working fluid flow passage which faces an outer peripheral surface of the bottom portion of the resin cylinder portion.

According to the above structure, since the formation of the working fluid discharge guide groove in the resin cylinder portion can eliminate the need to form a flow passage in the cap made of metal, the working of the piston pump can be facilitated and the piston pump can be manufactured at a low cost.

According to the piston pump of the invention, while preventing the increased cost of the composing parts of the piston pump, the durability of the piston pump can be enhanced.

DETAILED DESCRIPTION

An embodiment is described with reference to the accompanying drawings. First, the structure of a piston pump according to the present embodiment will be described.

Figure 1:
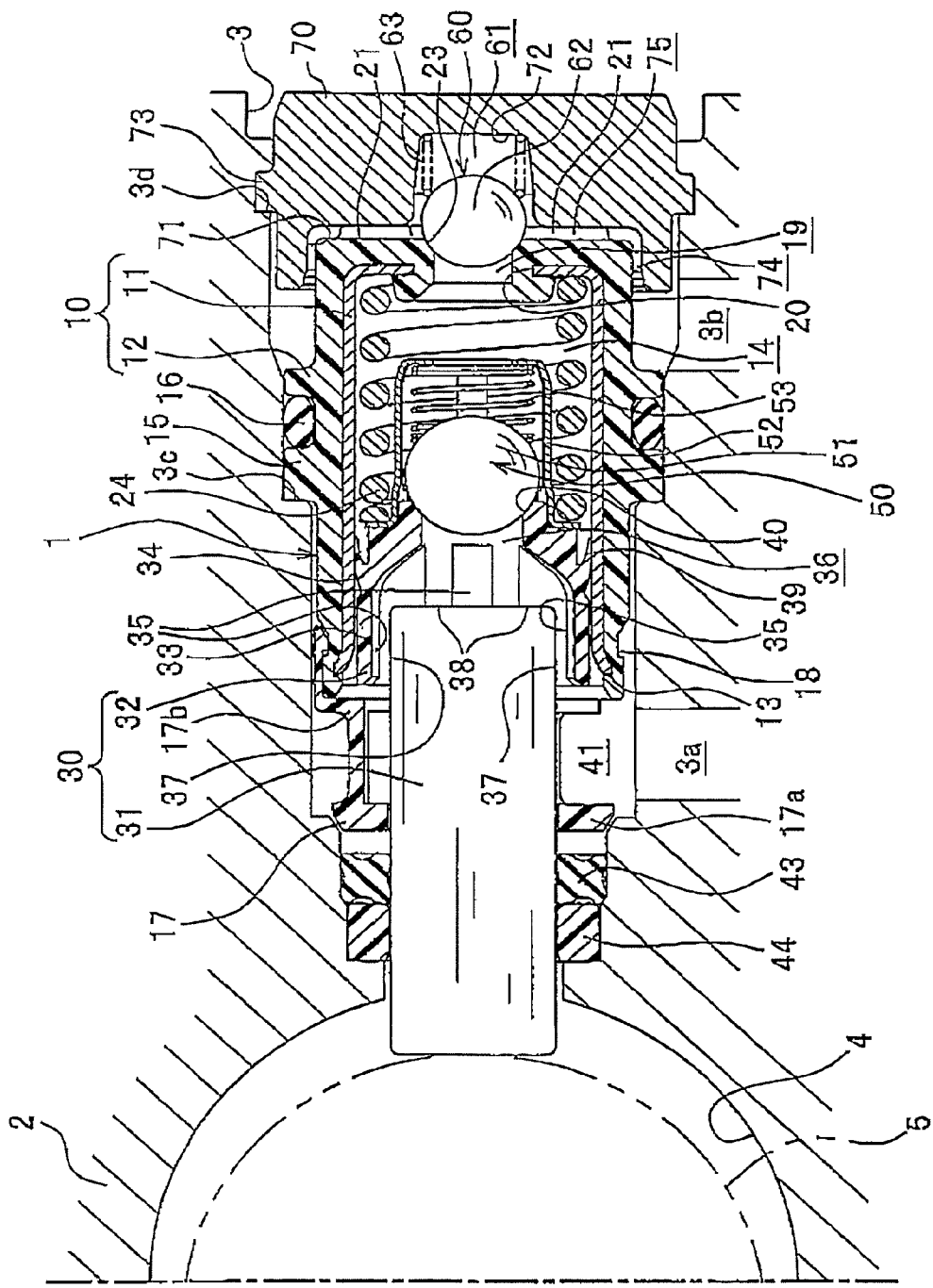
FIG. 1 is a section view of a piston pump according to an embodiment, showing a state where it is mounted onto a base body.

As shown in FIG. 1, a piston pump 1 is used in, for example, in a brake fluid pressure control apparatus for a vehicle, and it is mounted in a pump hole 3 formed in a base body (a pump body) 2. The base body 2 is formed of an extruded material or a casting which is made of aluminum alloy and has a substantially rectangular parallelepiped shape, while it includes a flow passage (an oil passage) thereinside for a fluid, that is, a working fluid (a brake fluid).

Here, in the description of the present embodiment, when the pump hole 3 is viewed in the axial direction thereof, the deep side of the pump hole 3 (that is, the side on which a cam storage hole 4 to be discussed later is situated) is expressed as "a forward direction", whereas the near side of the pump hole 3 (the front surface side of the base body 2) is expressed as "a backward direction". These terms "forward direction" and "backward direction" are directions which have no relations with the mounting direction of the vehicle brake fluid pressure control apparatus or the direction of a vehicle body.

The pump hole 3 is a stepped cylindrical hole and is formed to penetrate from the side surface of the base body 2 to the cam storage hole 4. The pump hole 3 is formed of a pair of pump holes which are respectively formed on both sides laterally of the cam storage hole 4, while the two pump holes 3 are respectively opened and are faced to each other with the cam storage hole 4 between them. Here, the cam storage hole 4 is a portion where an eccentric cam 5 provided on the output shaft of a motor (not shown) can be rotated. Each pump hole 3 is formed such that its center line passes through the center of the cam storage hole 4. In the pump hole 3, there are opened up a suction flow passage 3a and a discharge flow passage 3b which are in communication with each other. The suction flow passage 3a is in communication with a reservoir (not shown) and guides a brake fluid from the reservoir to the piston pump 1. Also, the discharge flow passage 3b communicates with a flow passage (not shown) connected to a hole (bore) into which there can be mounted electronic equipment such as an electromagnetic valve or a pressure sensor; and also, the discharge flow passage 3b also communicates with an opening from which the brake fluid is sent out to the present discharge flow passage.

The piston pump 1 includes a cylinder 10, a piston 30, a suction valve unit 50, a discharge valve unit 60, and a cap 70.

Figure 4:
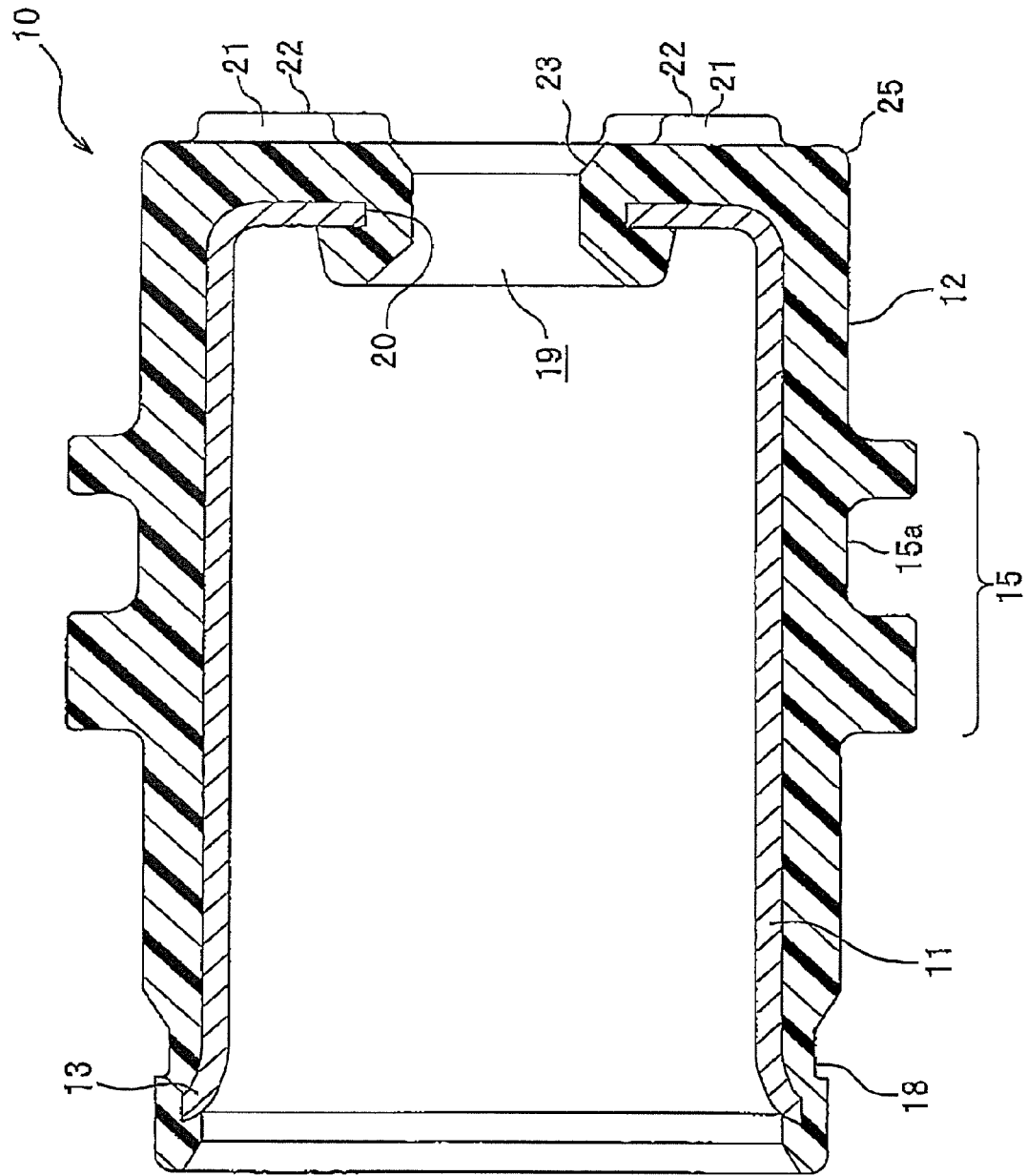
FIG. 4 is a section view of a cylinder included in the piston pump according to the embodiment.

The cylinder 10, as shown in FIGS. 1 and 4, is formed to have a bottomed cylindrical shape which is opened forwardly. Into the cylinder 10, there can be stored the piston 30 slidably. The cylinder 10 includes a pipe cylinder portion 11 and a resin cylinder portion 12. The pipe cylinder portion 11 has a bottomed cylindrical shape, and the inner peripheral surface of the cylindrical portion thereof functions as a sliding portion with the piston 30. The pipe cylinder portion 11 is formed of a member made of metal such as hardened steel and is formed by press working such as by drawing. The pipe cylinder portion 11 includes a flange portion 13 which is formed in the front opening end portion (in FIGS. 1 and 4, the left side end portion) thereof and spreads radial outward thereof. The flange portion 13 is formed by using a curved portion as it is, while such curved portion is formed in the opening end portion of the pipe cylinder portion 11 when it is formed by drawing. Inside the pipe cylinder portion 11, a pressure chamber 14 is formed (see FIG. 1). The pressure chamber 14 is defined to be surrounded by the pipe cylinder portion 11 and the large diameter piston portion 32 (which will be discussed later) of the piston 30.

The resin cylinder portion 12 has a bottomed cylindrical shape and covers the outer periphery and bottom portion of the pipe cylinder portion 11. In the axial direction intermediate portion of the outer peripheral surface of the resin cylinder portion 12, a positioning portion 15 is formed. The diameter of the positioning portion 15 is larger than the diameter of the other portions of the resin cylinder portion 12; and thus, when the forward end of the positioning portion 15 is contacted with and secured to the stepped surface 3c of the pump hole 3, the resin cylinder portion 12 can be positioned in the axial direction thereof. In the positioning portion 15, specifically, between the inner peripheral surface of the pump hole 3 and itself, a groove portion 15a (see FIG. 4) for mounting an O ring (see FIG. 1) is formed. As shown in FIG. 1, such portion of the outer peripheral surface of the resin cylinder portion 12 as exists forwardly of the positioning portion 15 is structured to face the inner peripheral surface of the pump hole 3 with a clearance between them. In the front end portion of the outer peripheral surface of the resin cylinder portion 12, a securing recessed portion 18 for holding a seal stopper 17 (which will be discussed later) is formed.

In the central portion of the bottom portion of the resin cylinder portion 12, a penetration hole is formed as a discharge passage 19. The discharge passage 19 is a flow passage used to discharge a working fluid, which has been sucked into the pressure chamber 14, to the cap 70 side. The resin around the discharge passage 19 is formed to project forwardly from the inside surface of the bottom portion of the resin cylinder portion 12.

In the central portion of the bottom portion of the pipe cylinder portion 11, a penetration hole 20 is formed. The penetration hole 20 is formed larger in diameter than the discharge passage 19 and is arranged to surround the discharge passage 19 at a given distance therefrom. The peripheral edge portion of the penetration hole 20 is embedded in the resin around the discharge passage 19. On the other hand, the flange portion 13 of the pipe cylinder portion 11 is embedded in the resin that is situated in the inner periphery of the front end portion of the resin cylinder portion 12. The pipe cylinder portion 11 is formed integrally with the resin cylinder portion 12 by insert forming, while the flange portion 13 of the pipe cylinder portion 11 and the peripheral edge portion of the penetration hole 20 are respectively embedded in the resin of the resin cylinder portion 12. Here, in the present embodiment, the expression "to form integrally" means that two parts made of different materials (the pipe cylinder portion 11 and resin cylinder portion 12) are formed into an integral body. And, when the piston pump 1 is assembled to the base body 2, the piston pump 1 is formed as a single part.

The cap 70, as shown in FIG. 1, covers the bottom portion of the cylinder 10 from outside (from the opening end side of the pump hole 3 which is opened on the side surface of the base body 2) to thereby cover the pump hole 3. The cap 70 is formed of a metal-made member formed separately from the cylinder 10 and having a bottomed cylindrical shape. A large diameter portion 73 is projected from the outer peripheral surface of the cap 70 to be pressed against the inner peripheral surface of the pump hole 3. Thus, when the cap 70 is inserted into the pump hole 3, the cap 70 can be fixed to the base body 2 in a fluid tight manner. In this case, the forward end of the large diameter portion 73 is secured to the stepped surface 3d of the pump hole 3, whereby the cap 70 can be positioned in the axial direction thereof.

The cap 70 has a large diameter recessed portion 71 for receiving the bottom portion of the resin cylinder portion 12, and a small diameter recessed portion 72 having a smaller diameter than the large diameter recessed portion 71, at the inside thereof. The small diameter recessed portion 72, when it is combined with the bottom portion of the resin cylinder portion 12, defines a discharge valve chamber 61 into which the discharge valve means 60 can be stored. The large diameter recessed portion 71 is formed such that the inside diameter thereof is larger than the outside diameter of the bottom portion of the resin cylinder portion 12. When the cap 70 is mounted onto the pump hole 3, a cylindrical space between is defined the inner peripheral surface of the cylindrical portion of the large diameter recessed portion 71 and the outer peripheral surface of the bottomed portion the resin cylinder portion 12; and, this cylindrical space forms a flow passage 74 for the working fluid. In the peripheral surface of the pump hole 3 around the front end portion of the cap 70, a discharge flow passage 3b is opened to communicate with the flow passage 74. Specifically, the flow passage 74 is connected from the front end opening portion of the large diameter recessed portion 71 to the space within the pump hole 3, whereby the flow passage 74 is allowed to communicate with the discharge flow passage 3b.

Figure 5:
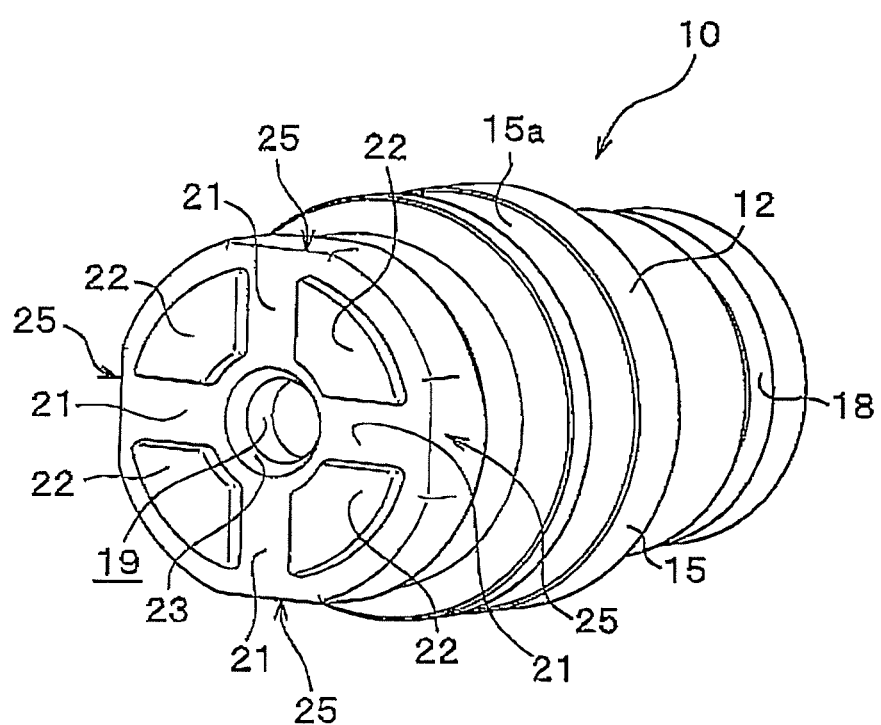
FIG. 5 is a backward perspective view of the cylinder of the piston pump according to the embodiment.

On the other hand, in the outside surface (the backward surface faced to the bottom surface of the cap 70) of the bottom portion of the resin cylinder portion 12, as shown in FIGS. 4 and 5, there is formed a working fluid discharge guide groove 21. The working fluid discharge guide groove 21 is used to move the working fluid from the discharge passage 19 to a working fluid flow passage (the discharge flow passage 3b) which is faced to the outer peripheral surface of the cylinder 10. The working fluid discharge guide groove 21 is formed between two mutually adjoining projecting portions 22 and 22 by spacing them from each other at a given distance when multiple projecting portions 22 are provided on the outside surface of the bottom portion of the resin cylinder portion 12. That is, the mutually adjoining and faced side surfaces of the two projecting portions 22 and 22 form the wall surface of the working fluid discharge guide groove 21. The working fluid discharge guide groove 21 extends radial outward from the discharge passage 19 of the bottom portion of the resin cylinder portion 12 up to the peripheral edge portion of the bottom portion of the resin cylinder portion 12. The working fluid discharge guide groove 21 has a cross shape when it is viewed from front. As shown in FIG. 5, in the bottom portion outer periphery of the resin cylinder portion 12, a linear portion 25 is formed at a radial outward position with respect to the working fluid discharge guide groove 21.

As shown in FIG. 1, when the bottom portion of the resin cylinder portion 12 and the large diameter recessed portion 71 of the cap 70 are combined together, the bottom surface of the large diameter recessed portion 71 and the working fluid discharge guide groove 21 of the resin cylinder portion 12 cooperate together to define a flow passage 75 for the working fluid. This flow passage 75 has a cross shape, while the discharge passage 19 is situated in the central portion of the flow passage 75. To the outer periphery of the flow passage 75, there is connected a cylindrical flow passage 74 which is in communication with the discharge flow passage 3b. That is, the working fluid flows from the discharge passage 19, passes through the flow passage 75 defined using the working fluid discharge guide groove 21, and further passes through the flow passage 74. And, the working fluid flows into the working fluid flow passage (discharge flow passage 3b) which is opened in the inner peripheral surface of the pump hole 3 to face the outer peripheral surface of the bottom portion of the resin cylinder portion 12. Due to formation of the linear portion 25 in the outer periphery of the bottom portion of the resin cylinder portion 12, the flow passages 74 and 75, which are defined by the bottom portion of the resin cylinder portion 12 and the large diameter recessed portion 71 of the cap 70, are widened, whereby the working fluid is easy to flow toward the side portion of the outer peripheral surface of the resin cylinder portion 12.

The discharge valve unit 60 is used to open and close the discharge passage 19 of the resin cylinder portion 12 and is stored in the discharge valve chamber 61. The discharge valve unit 60 includes a spherical-shaped discharge valve body 62 so disposed as to cover the discharge passage 19 and a discharge valve spring 63 arranged in the discharge valve chamber 61 in a compressed state. The discharge valve body 62 is energized toward the discharge passage 19 by the restoring force of the discharge valve spring 63.

As shown in FIGS. 4 and 5, the resin cylinder portion 12 includes a valve seat portion 23 on which the discharge valve body 62 (see FIG. 1) can be seated. The valve seat portion 23 is formed as a part of the resin cylinder portion 12. The valve seat portion 23 is formed by bending the opening peripheral edge portion of the discharge passage 19 at the cap 70 side in accordance with the curvature of the discharge valve body 62.

Figure 2:
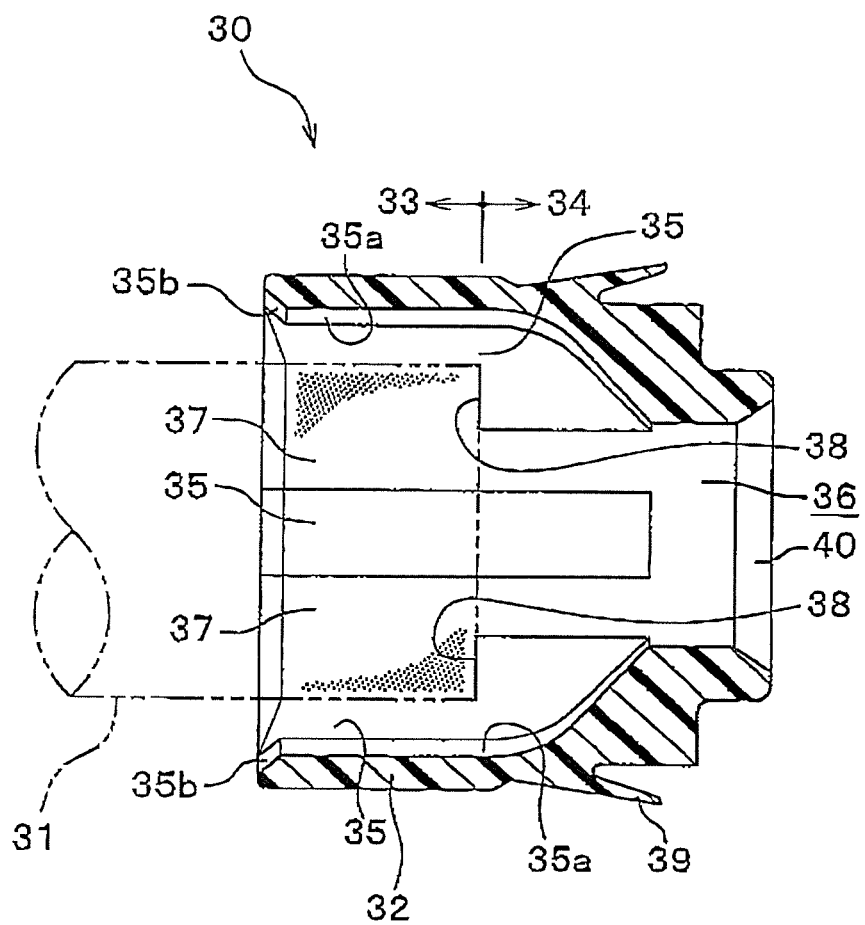
FIG. 2 is a section view of a piston included in the piston pump according to the embodiment.
Figure 3A:
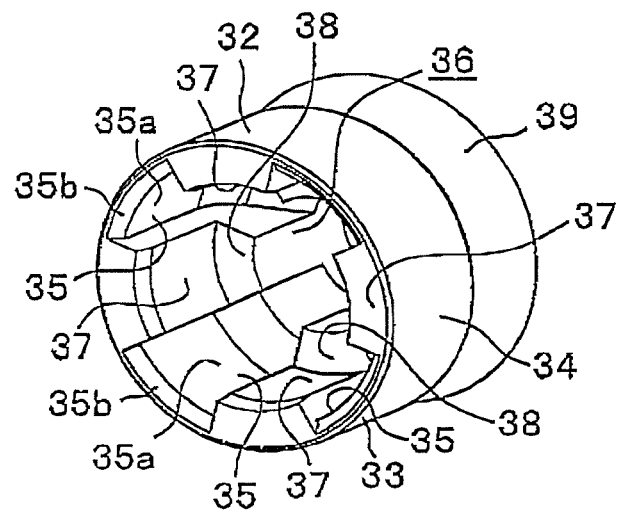
FIG. 3A is a forward perspective view of the large diameter piston portion of the piston according to the embodiment.
Figure 3B:
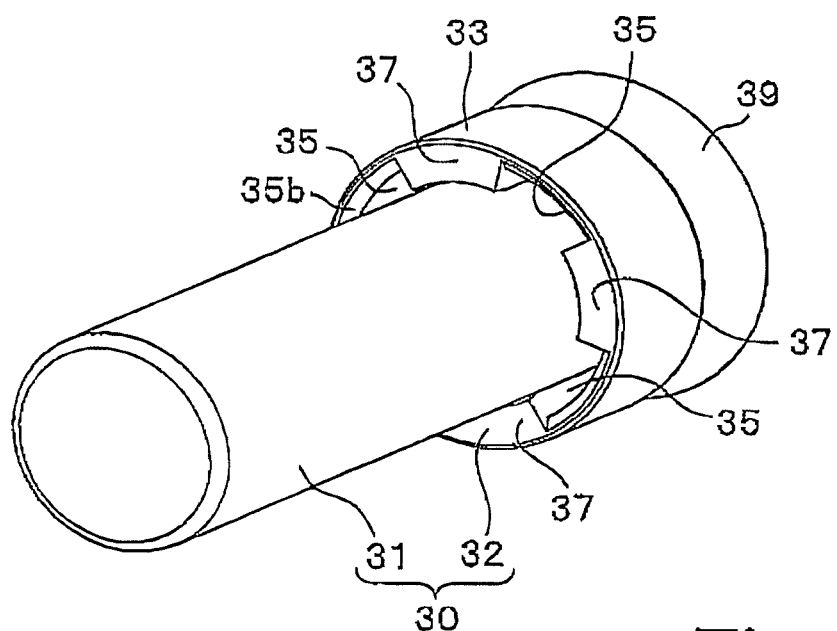
FIG. 3B is a forward perspective view of the large diameter piston portion and cylindrical piston portion of the piston according to the embodiment.

As shown in FIG. 1, the piston 30 is structured such that, with the rotational movement of an eccentric cam 5 provided on a motor, it reciprocates within the inside hollow portion of the cylinder 10. As shown in FIGS. 1 to 3, the piston 30 includes a cylindrical piston portion 31 and a large diameter piston portion 32 for covering one end portion of the cylindrical piston portion 31.

The cylindrical piston portion 31 is made of metal material such as hardened steel. The cylindrical piston portion 31 is formed of a metal-made core roller shaped member having a cylindrical shape. One end portion (the rear end portion) of the cylindrical piston portion 31 at the cylinder 10 side is fitted with the cylindrical portion 33 of its large diameter piston portion 32 which will be discussed later. The other end portion (the front end portion) of the cylindrical piston portion 31 is projected into the cam storage hole 4 of the motor. Here, on the outer peripheral surface of the cylindrical piston portion 31, there are slidably mounted a circular seal member 43 and a bush 44 which can be respectively contacted with the pump hole 3.

The seal member 43 and bush 44 are prevented against slippage to the large diameter portion of the pump hole 3 by the seal stopper 17 that is secured to the securing recessed portion 18 of the resin cylinder portion 12. The seal stopper 17 is a frame-shaped member which surrounds the cylindrical piston portion 31. When the seal member 43 is going to move toward the large diameter portion of the pump hole 3, the seal stopper 17 is contacted with the front end face of the seal member 43 to hold the seal member 43, thereby preventing the slippage of the seal member 43 and bush 44. The seal stopper 17 includes a frame member 17a so disposed as to surround the cylindrical piston portion 31, and a securing piece 17b extending out from the frame member 17a toward the cylinder 10. Since the securing piece 17b is secured to the securing recessed portion 18 of the resin cylinder portion 12, the seal stopper 17 can be held to and by the resin cylinder portion 12.

As shown in FIGS. 1 and 2, the large diameter piston portion 32 has a bottomed cylindrical shape and includes a cylindrical portion 33 and a bottom portion 34. The large diameter piston portion 32 is formed by resin molding. The large diameter piston portion 32 is so disposed as to open forwardly. The cylindrical portion 33 of the large diameter piston portion 32 has an inside diameter slightly smaller than the outside diameter of the cylindrical piston portion 31, while the cylindrical piston portion 31 can be fitted into the large diameter piston portion 32 by light pressure. The bottom portion 34 of the large diameter piston portion 32 provides the portion that is situated backwardly of one end (the rear end) of the cylindrical piston portion 31 fitted into the large diameter piston portion 32 (see FIG. 2).

As shown in FIGS. 1 to 3, inside the large diameter piston portion 32, there are formed multiple working fluid guide grooves 35 respectively extending in the axial direction of the piston 30. Each working-fluid guide groove 35 extends from the front end of the cylindrical portion 33 up to the bottom portion 34 of the large diameter piston portion 32 and is connected to a suction passage 36 formed in the bottom portion 34. The suction passage 36 is formed of a penetration hole formed in the central portion of the bottom portion of the large diameter piston portion 32. This penetration hole is formed along the axial direction of the large diameter piston portion 32. The front end of each working fluid guide groove 35 is opened forwardly and is in communication with a circular space 41 (see FIG. 1) formed around the cylindrical piston portion 31. The front end portion of the bottom surface 35*a* of the working fluid guide groove 35 is tapered to be increased in a diameter toward the front end thereof (as it goes toward the front end thereof, the cylindrical portion 33 becomes smaller in the thickness). This tapered portion forms an in-flow guide portion 35*b* which facilitates the suction of the working fluid within the circular space 41 into the working fluid guide groove 35.

The bottom surfaces 35*a* of the working fluid guide grooves 35 are formed substantially parallel to each other in the axial direction in the cylindrical portion 33. In the bottom portion 34, the bottom surface 35*a* of each working fluid guide groove 35 is inclined to approach the suction passage 36 (narrowed in the radial direction backwardly along the axial direction. The inclined portion of the bottom surface 35*a* is connected to the suction passage 36 at an angle of inclination of about 45° with respect to the axial direction of the working fluid guide groove 35. The boundary portion between the parallel portion and inclined portion of the bottom surface 35*a* is structured to allow the working fluid to flow smoothly.

The working fluid guide grooves 35 are formed in four lines at a pitch of 90° in the circumferential direction of the large diameter piston portion 32. The inner peripheral surface of the cylindrical portion 33 interposed between the two mutually adjoining working fluid guide grooves 35 and 35 forms a fit portion 37 with which one end portion (the rear end portion) of the cylindrical piston portion 31 can be fitted. In other words, it can also be said that the fit portion 37 separates the two mutually adjoining working fluid guide grooves 35 and 35 from each other. The front end portion of the fit portion 37 is tapered to be increased in a diameter toward the end portion thereof, to thereby form a guide portion for the cylindrical piston portion 31 to be inserted into the fit portion 37. The fit portion 37 holds one end portion of the cylindrical piston portion 31 so as surround it from four directions. Here, the number of lines of the working fluid guide grooves 35 and fit portions is not limited to four, but it may be any number provided that the flow rate of the working fluid necessary by the working fluid guide grooves 35 can be secured and the fit portions 37 are capable of fixing the cylindrical piston portion 31.

Such portion of the bottom portion 34 of the large diameter piston 32 as is situated between the two mutually adjoining working fluid guide grooves 35 and 35 form the axial direction position restricting portion 38 of the cylindrical piston portion 31. With the axial direction position restricting portion 38, there can be contacted, in the piston axial direction, one end (the rear end) of the cylindrical piston portion 31 inserted from the cam storage hole 4 side. That is, the axial direction position restricting portion 38 restricts the axial direction position of the cylindrical piston portion 31 to thereby position it. The axial direction position restricting portion 38 is formed to be connected to the fit portion 37 and to intersect at right angles therewith; and a suction passage 36 is disposed on the radial center side thereof. According to the present embodiment, the axial direction position restricting portion 38 is formed at four positions and these four axial direction position restricting portions 38 are respectively connected to their associated fit portions 37. However, this is not limitative but it may be formed at least at one position.

When the cylindrical piston portion 31 is fitted into the large diameter piston portion 32, the outer peripheral surface of the cylindrical piston portion 31 and the surface of the working fluid guide groove 35 of the cylindrical portion 33 cooperate together to define a space. Further, one end face of the cylindrical piston portion 31 and the working fluid guide groove 35 of the bottom portion 34 cooperate together to define a space. These spaces provide a working fluid guide passage which is connected from the front end of the cylindrical portion 33 to the suction passage 36.

In the outer peripheral surface of the bottom portion 34 of the large diameter piston portion 32, there is formed a sliding portion 39 which can be contacted with the inner peripheral surface of the pipe cylinder portion 11 and can be slid thereon. The sliding portion 39 has a cylindrical shape the diameter of which increases backwardly. While, the outer peripheral surface of the end portion of the sliding portion 39 is pressed against the pipe cylinder portion 11 with a proper pressure to thereby secure a sealed condition between them, the sliding portion 39 is allowed to slide on the inner peripheral surface of the pipe cylinder portion 11.

As shown in FIG. 1, in the pressure chamber 14 formed inside the cylinder 10, there are provided return springs 24. The return springs 24 are respectively disposed within the pressure chamber 14 in a compressed state, and due to the restoring forces thereof, the return springs 24 press against the piston 30 forwardly. The return springs 24 according to the present embodiment are respectively interposed between the bottom surface of the pipe cylinder portion 11 and the outside surface of the bottom portion 34 of the large diameter piston portion 32. Between the outside surface of the bottom portion 34 of the large diameter piston portion 32 and return springs 24, the flange portion of the opening peripheral edge of a retainer 52 (which will be discussed later) is interposed. That is, the return springs 24 can press against the piston 30 through the retainer 52.

The suction valve unit 50 is used to open and close the suction passage 36, and it is stored in the pressure chamber 14. Specifically, the suction valve unit 50 includes a suction valve body 51, a retainer 52 and a suction valve spring 53. The suction valve body 51 is a valve body which is so disposed as to cover the opening of the suction passage 36. The retainer 52 has a bottomed cylindrical shape and is disposed to cover the suction valve body 51. The suction valve spring 53 is interposed between the suction valve body 51 and retainer 52 in a compressed state. The suction valve body 51 is energized toward the large diameter piston portion 32 due to the restoring force of the suction valve spring 53. Here, while the opening of the retainer 52 is fitted with the outside surface of the bottom portion 34 of the large diameter piston portion 32, the retainer 52 is pressed against the large diameter piston portion 32 due to the restoring force of the return spring 24.

The large diameter piston portion 32 includes a valve seat portion 40 on which the suction valve body 51 can be seated thereinside. The valve seat portion 40 is formed of resin as a part of the large diameter piston portion 32. Specifically, the valve seat portion 40 is formed by curved-surface molding the peripheral edge portion of the cap 70 side opening of the suction passage 36 according to the curvature of the suction valve body 61. The valve seat portion 40 is formed continuously with the working fluid guide groove 35 through the suction passage 36.

Next, description will be given below of the operation effects of the piston pump 1 according to the present embodiment.

In the piston pump 1 according to the present embodiment, since the working fluid guide groove 35 is formed inside the large diameter piston portion 32 along the axial direction (the moving direction) of the piston 30 and its front end is opened in the circular space 41, in the return step of the piston 30 (when the pressure chamber 14 is spread), the large diameter piston portion 32 moves toward the working fluid that is collecting in the circular space 41. Due to this, part of the working fluid within the circular space 41 is taken into the working fluid guide groove 35, while part of the working fluid within the working fluid guide groove 35 is pushed from the suction passage 36 into the pressure chamber 14. In this case, since the pressure within the pressure chamber 14 becomes more negative than the pressure within the large diameter piston portion 32, the suction valve unit 50 is pulled toward the pressure chamber 14 and is also pressed by the working fluid within the large diameter piston portion 32, thereby opening the suction valve.

In the compressing step of the piston 30 (when the pressure chamber 14 is narrowed), since the suction valve unit 50 closes the suction valve to move the piston 30 toward the pressure chamber 14, the working fluid within the working fluid guide groove 35 is moved toward the pressure chamber 14 together with the cylindrical piston portion 31 and large diameter piston portion 32. In this case, since the capacity of a space connected from the circular space 41 to the suction passage 36 is increased and is made negative in pressure by an amount equivalent to the movement of the piston 30, a new working fluid is taken from the suction flow passage 3a into the circular space 41. By repeating the above steps sequentially, the working fluid is allowed to flow from the suction flow passage 3a through the circular space 41, working fluid guide groove 35 and suction passage 36 into the pressure chamber 14.

Briefly, according to the present embodiment, since the working fluid guide groove 35 is formed in the axial direction of the piston 30, the flow direction of the working fluid and the moving direction of the piston 30 coincide with each other. Owing to this, the working fluid is sucked linearly into inside the working fluid guide groove 35 without the flow direction thereof being changed, thereby reducing the suction resistance. This can enhance the suction efficiency of the working fluid. Further, the movement of the piston 30, which is allowed to reciprocate by the drive force of the motor and the reacting force of the return spring 24, can be used for suction of the working fluid. Especially, since the operation in the return step of the piston 30 due to the reacting force of the return spring 24 can also be used for suction of the working fluid, the suction efficiency of the working fluid can be enhanced further.

Further, the working fluid sucked into the working fluid guide groove 35 is charged into the suction passage 36 along the bottom surface 35a of the working fluid guide groove 35. Here, since the parallel portion and inclined portion of the bottom surface 35a is formed as a smooth curved surface, the working fluid is allowed to flow smoothly. And, since the inclined portion of the bottom surface 35a is connected to the suction passage 36 at an inclination angle of about 45°, within the suction passage 36 as well, the working fluid is allowed to flow smoothly toward the pressure chamber 14.

Further, the piston 30 is formed of the metal-made cylindrical piston portion 31 and resin-molded large diameter piston portion 32. As a result, by the cylindrical piston portion 31, the piston 30 has the strength at a portion where contacted by the eccentric cam 5 of the output shaft of the motor (not shown) and the durability against the sliding of the eccentric cam 5. Also, since the cylindrical piston portion 31 is formed of a metal-made core shaped roller member easy to obtain, it can be provided at a low cost. On the other hand, since the working fluid guide groove 35 and suction passage 36 are formed in the resin-made large diameter piston portion 32, the large diameter piston portion 32 having a relatively complicated shape can be molded easily without carrying out a cutting working or the like. Therefore, the large diameter piston portion 32 can be manufactured at a low cost and thus the cost of the piston 30 can be reduced.

Also, since the working fluid guide grooves 35 are formed in four lines at a pitch of 90°, a lot of working fluids can be sucked and thus the suction efficiency of the working fluid can be enhanced. Further, since the flow-in guide portion 35b is formed in the front end of the working fluid guide groove 35, the working fluid within the circular space 41 can be sucked smoothly into the working fluid guide groove 35, which can reduce the suction resistance of the working fluid and thus the suction efficiency of the working fluid can be enhanced.

Since there are formed the multiple fit portions 37 between the mutually adjoining working fluid guide grooves 35, 35, while the radial direction positioning of the cylindrical piston portion 31 can be carried out easily, the cylindrical piston portion 31 can be fixed easily to the large diameter piston portion 32. In this case, since the large diameter piston portion 32 is made of resin, the cylindrical piston portion 31 can be easily inserted into the large diameter piston portion 32 with light pressure. Further, in the sliding operation of the piston 30, the cylindrical piston portion 31 can be prevented from shifting from its proper position. Also, since the axial direction position restricting portion 38 with which the cylindrical piston portion 31 can be contacted is formed in the large diameter piston portion 32, the fitting position when fitting the cylindrical piston portion 31 into the large diameter piston portion 32 can be restricted easily and accurately.

Also, since the valve seat portion 40 on which the suction valve body 51 can be seated is formed using the resin of the large diameter piston portion 32, it is not necessary to form the valve seat portion 40 using different resin, thereby reducing the manufacturing labor and cost of the piston. And, since the valve seat portion 40 is formed of resin, the valve seat portion 40 and the suction valve body 51 are more closely contacted as compared with a case when the valve seat portion is formed of metal, thereby further enhancing the sealing performance therebetween. Further, the valve seat portion 40 is formed to be connected with the working fluid guide grooves 35 through the suction passage 36. Thanks to this, when the working fluid passes through the working fluid guide groove 35, it is sucked into the pressure chamber 14 as it is, which can enhance the suction efficiency of the working fluid still further.

Further, according to the present embodiment, since the cylinder 10 includes the metal-made pipe cylinder portion 11 and resin cylinder portion 12, neither the resin cylinder portion nor the pipe cylinder portion needs not a cutting working, whereby the cylinder 10 can be manufactured at a low cost. Since the sliding portion, on which the piston 30 slides, is formed of the metal-made pipe cylinder portion 11, the durability thereof can be secured.

Also, since the pipe cylinder portion 11 is formed integrally with the resin cylinder portion 12 by insert molding, the number of parts necessary in the assembling operation does not increase. Therefore, it can prevent the assembling labor from increasing.

Since the pipe cylinder portion 11 includes the flange portion 13 and this flange portion 13 is embedded in the resin cylinder portion 12, the engagement between the pipe cylinder portion 11 and resin cylinder portion 12 can be enhanced. Also, the flange portion 13 can be used effectively without removing a flange portion which is inevitably produced when the pipe cylinder portion 11 is formed by press working.

Further, since the peripheral edge portion of the penetration hole 20 of the bottom portion of the pipe cylinder portion 11 is also embedded in the resin cylinder portion 12, the pipe cylinder portion 11 is fixed such that the front and rear ends thereof are embedded in the resin cylinder portion 12. Therefore, the engagement of the pipe cylinder portion 11 with the resin cylinder portion 12 can be enhanced still further.

Also, since the valve seat portion 23 is formed as a part of the resin cylinder portion 12, it is not necessary to provide the separate valve seat portion, the manufacturing labor and cost of the resin cylinder portion 12 can be reduced. And, since the valve seat portion 23 is made of resin, as compared with a case where the valve seat portion 23 is made of metal, the valve seat portion 23 and the discharge valve body 62 are more closely contacted, thereby enhancing the sealing performance therebetween.

Further, since the working fluid discharge guide groove 21 is formed in the outside surface of the bottom portion of the resin cylinder portion 12, even in a shape where the surface of the large diameter recessed portion 71 of the cap 70 remains flat, when the cap 70 is combined with the bottom portion of the resin cylinder portion 12, there is formed the flow passage 75. Therefore, this eliminates the need to carry out a specific working operation to form a flow passage in the cap 70 made of metal, whereby the present embodiment can be worked easily and manufactured at a low cost.

As has been described heretofore, according to the piston pump 1 of the present embodiment, while preventing the increased cost of the composing parts thereof, the suction efficiency of the working fluid can be enhanced. Further, the durability of the sliding portion of the cylinder 10 can also be enhanced.

Although description has been given heretofore of the embodiment for enforcing the invention, the invention is not limited to the above-mentioned embodiment but it can also be changed in design properly without departing from the subject matter of the invention. For example, in the above embodiment, the pipe cylinder portion 11 is formed to have a bottomed cylindrical shape. However, this is not limitative. The pipe cylinder portion 11 may have a cylindrical shape which is formed at least in the portion where the piston slides. In this case, preferably, in the two front and rear portions of the pipe cylinder portion, there may be formed two flange portions the diameters of which increase outwardly and these two flange portions may be embedded in the inner peripheral surface of the cylindrical portion of the resin cylinder portion. In this case, the engagement between the pipe cylinder portion and resin cylinder portion can be enhanced.

The invention claimed is:

1. A piston pump, comprising:
a cylinder having a bottomed cylindrical shape;
a piston slidable within the cylinder, the cylinder and the piston defining a pressure chamber therebetween;
a suction valve unit disposed in a suction passage of the pressure chamber; and
a discharge valve unit disposed in a discharge passage of the pressure chamber,
wherein the piston includes
a cylindrical piston portion and
a large diameter piston portion provided to cover one end of the cylindrical piston portion, and
wherein the large diameter piston portion includes a working fluid guide groove extending thereinside along the axial direction of the piston.

2. The piston pump of claim 1,
wherein the working fluid guide groove includes multiple lines of working fluid guide grooves, and
wherein, on an inner peripheral surface of the large diameter piston portion, multiple fit portions are formed between the multiple working fluid guide grooves so as to be fitted with the one end of the cylindrical piston portion.

3. The piston pump of claim 1,
wherein the large diameter piston portion includes an axial direction position restricting portion to be contacted with the cylindrical piston portion in the piston axial direction.

4. The piston pump of claim 1,
wherein the large diameter piston portion includes a valve seat portion formed thereinside to receive a suction valve body of the suction valve unit, the large diameter piston portion being formed continuously with the working fluid guide grooves.

5. The piston pump of claim 1,
wherein the large diameter piston portion is formed by resin molding.

6. The piston pump of claim 1,
wherein the cylindrical piston portion is formed of a metal-made core-shaped roller member.

7. The piston pump of claim 1,
wherein the cylinder includes
a metal-made pipe cylinder portion as a sliding portion with respect to the piston and
a bottomed-cylindrical resin cylinder portion provided to cover an outer periphery of the pipe cylinder portion,
and wherein the pipe cylinder portion is formed integrally with the resin cylinder portion by insert molding.

8. The piston pump of claim 1,
wherein the cylinder includes:
a metal-made pipe cylinder portion as a sliding portion with respect to the piston, and
a bottomed-cylindrical resin cylinder portion provided to cover an outer periphery of the pipe cylinder portion.

9. The piston pump of claim 7,
wherein the pipe cylinder portion includes an outwardly-spreading flange portion in an opening end of the resin cylinder portion, and
wherein the flange portion is embedded in the resin cylinder portion.

10. The piston pump of claim 8,
wherein the resin cylinder portion includes a valve seat portion formed to receive a discharge valve body of the discharge valve unit.

11. The piston pump of claim 8,
wherein a working fluid discharge guide groove is formed on a portion of an outside surface of a bottom portion of the resin cylinder portion which faces a cap covering a pump hole, and
wherein the working fluid discharge guide groove guides the working fluid from the discharge passage to a working fluid flow passage which faces an outer peripheral surface of the bottom portion of the resin cylinder portion.

12. The piston pump of claim 1,
wherein the working-fluid guide groove extends from a front end of a cylindrical portion up to a bottom portion of the large diameter piston portion and is connected to the suction passage formed in the bottom portion.

13. The piston pump of claim 1,
wherein a front end portion of a bottom surface of the working fluid guide groove is tapered to be increased in a diameter toward the front end portion, and
wherein the tapered portion forms an in-flow guide portion which facilitates suction of working fluid within a circular space and into the working fluid guide groove.

14. The piston pump of claim 13,
wherein in a bottom portion, the bottom surface of the working fluid guide groove is inclined to approach the suction passage, and
wherein the inclined portion of the bottom surface is connected to the suction passage at an angle of inclination of about 45° with respect to the axial direction of the working fluid guide groove.

15. The piston pump of claim 2,
wherein a front end portion of the fit portion is tapered to be increased in a diameter toward an end portion thereof, to thereby form a guide portion for the cylindrical piston portion to be inserted into the fit portion.

16. The piston pump of claim 3,
wherein a portion of a bottom portion of the large diameter piston is situated between two mutually adjoining working fluid guide grooves to form the axial direction position restricting portion of the cylindrical piston portion.

17. The piston pump of claim 1,
wherein when the cylindrical piston portion is fitted into the large diameter piston portion, an outer peripheral surface of the cylindrical piston portion and a surface of the working fluid guide groove cooperate together to define a space,
one end face of the cylindrical piston portion and the working fluid guide groove of a bottom portion cooperate together to define a space, and
the spaces provide a working fluid guide passage which is connected from a front end of the cylindrical portion to the suction passage.

18. The piston pump of claim 17,
wherein a sliding portion is formed of an outer peripheral surface of the bottom portion of the large diameter piston portion, which is contacted with an inner peripheral surface of a pipe cylinder portion,
wherein the sliding portion has a cylindrical shape of which the diameter increases backwardly, and
wherein the outer peripheral surface of the end portion of the sliding portion is pressed against the pipe cylinder portion to thereby secure a sealed condition between them.

19. The piston pump of claim 9,
wherein the pipe cylinder portion includes a tip which is structured as the outwardly- spreading flange portion in the opening end of the resin cylinder portion.

20. The piston pump of claim 8,
wherein an outer peripheral surface of the resin cylinder portion includes a groove portion between the inner peripheral surface of a pump hole and a securing recessed portion for holding a seal stopper.

* * * * *